(12) United States Patent
Klein et al.

(10) Patent No.: US 6,653,428 B1
(45) Date of Patent: Nov. 25, 2003

(54) COPOLYMERS WITH AMPHIPHILIC SUB-UNITS, A METHOD FOR PRODUCING THE SAME AND THE USE THEREOF

(75) Inventors: Johann Klein, Duesseldorf (DE); Kai Boege, Duesseldorf (DE); Thomas Moeller, Duesseldorf (DE); Klaus Friedrich, Bad Oeynhausen (DE)

(73) Assignee: Henkel Kommanditgesellschaft auf Aktien (Henkel KGaA), Duesseldorf (DE)

( * ) Notice: Subject to any disclaimer, the term of this patent is extended or adjusted under 35 U.S.C. 154(b) by 0 days.

(21) Appl. No.: 09/959,080

(22) PCT Filed: Apr. 7, 2000

(86) PCT No.: PCT/EP00/03141

§ 371 (c)(1),
(2), (4) Date: Feb. 19, 2002

(87) PCT Pub. No.: WO00/63264

PCT Pub. Date: Oct. 26, 2000

(30) Foreign Application Priority Data

Apr. 16, 1999 (DE) .......................................... 199 17 356

(51) Int. Cl.$^7$ .............................................. C08F 122/10
(52) U.S. Cl. .................... 526/321; 526/317.1; 526/322; 526/324; 526/325; 526/329; 526/329.6
(58) Field of Search ............................. 526/317.1, 322, 526/321, 329, 329.6, 324, 333, 325

(56) References Cited

U.S. PATENT DOCUMENTS

| | | | |
|---|---|---|---|
| 3,657,175 A | 4/1972 | Zimmerman et al. | 260/29.6 |
| 4,075,411 A | 2/1978 | Dickstein | 560/224 |

FOREIGN PATENT DOCUMENTS

| | | |
|---|---|---|
| DE | 196 09 789 | 9/1997 |
| DE | 197 54 315 | 6/1998 |
| EP | 0 011 806 | 6/1980 |
| EP | 0 930 395 | 7/1999 |
| WO | WO95/11341 | 4/1995 |

OTHER PUBLICATIONS

Dr. Herbert Pl Fiedler, Lexikon der Hifsstoffe fur Pharmazie, Kosmetick und angrenzends Gebiete, pp. 612–614 (1989).
Kirk–Othmer Encyclopedia of Chemical Technology, vol. 9, 3$^{rd}$ Ed., John Wiley & Sons, NY, pp. 910–919.

*Primary Examiner*—Helen L. Pezzuto
(74) *Attorney, Agent, or Firm*—Stephen D. Harper; Glenn E. J. Murphy

(57) ABSTRACT

The invention relates to a copolymer which can be obtained by radical copolymerisation of at least two components A and B. According to the invention, a) at least one ester of one at least difunctional carboxylic acid which has at least one olefinically unsaturated double bond is used with an alkyl oxide addition compound as component A and b) at least one additional monomer which can be subjected to radical polymerisation is used as component B. The invention also relates to a method for producing copolymers of this type and to the use thereof, in particular, to their use as a binding agent in adhesives.

15 Claims, No Drawings

COPOLYMERS WITH AMPHIPHILIC SUBUNITS, A METHOD FOR PRODUCING THE SAME AND THE USE THEREOF

CROSS-REFERENCE TO RELATED APPLICATIONS

This application is the U.S. National Stage application filed under 35 U.S.C. §371 of International Application No. PCT/EP00/03141, filed Apr. 7, 2000, in the European Patent Office, claiming priority under 35 U.S.C. §§119 and 365 of PCT/EP00/03141 and DE 199 17 356.7, filed on Apr. 16, 1999, in the German Patent Office.

DESCRIPTION OF THE INVENTION

This invention relates to a copolymer obtainable by radical copolymerization of at least two components A and B, a) at least one ester of an at least dibasic carboxylic acid containing at least one olefinically unsaturated double bond with at least one alkylene oxide adduct being used as component A and b) at least one other radically polymerizable monomer being used as component B.

The present invention also relates to a process for the production of such copolymers and to their use, more particularly to their use in adhesives.

Properties of polymers are often adapted to meet certain technical requirements by the use of a mixture of monomers in the polymerization process. The polymerization of a mixture of two or more monomers is often referred to as copolymerization and leads, for example, to copolymers containing two different types of monomer or to terpolymers corresponding to the use of three different types of monomer. In polymers such as these, certain technical properties can often be established in dependence upon the comonomer ratio selected and the comonomers selected.

Binders obtainable by radical polymerization of one or more radically polymerizable monomers are frequently used in the production of surface coatings or adhesives. Property variations are generally carried out by the procedure mentioned above, i.e. by copolymerization of suitable monomers.

It is known from the prior art that the flexibility of corresponding films, for example adhesive films, can be improved by the use of comonomers, such as dibutyl maleate, vinyl versatate or acrylates. Unfortunately, a disadvantage of using such comonomers is that the adhesion of such films or bonds to polar surfaces often deteriorates significantly due to the hydrophobia of the comonomers. In addition, there is an upper limit to the chain length in the alcohol residues of the comonomers used to the extent that comonomers with long-chain residues are not accessible to use in emulsion polymerization because their solubility in water is too poor.

Emulsion polymerizations, for example the emulsion polymerization of vinyl acetate, often require the addition of a protective colloid. Such a process step on the one hand increases the duration of the process and, on the other hand, adds to the cost of the production.

Accordingly, the problem addressed by the present invention was to provide a copolymer which could be produced without expensive process steps and which, when used in adhesives, would lead to flexible adhesive films showing excellent adhesion even to hydrophilic substrate surfaces. Another problem addressed by the present invention was to provide a process for the production of that copolymer.

The problems stated above are solved by a copolymer obtainable by the radical copolymerization of at least two components A and B, component A being a carboxylic acid ester of an unsaturated carboxylic acid with an alkylene oxide adduct and component B being another radically polymerizable monomer.

Accordingly, the present invention relates to a copolymer obtainable by radical copolymerization of at least two components A and B, a) at least one ester of an at least dibasic carboxylic acid containing at least one olefinically unsaturated double bond with an alkylene oxide adduct being used as component A and b) at least one other radically polymerizable monomer being used as component B.

A "copolymer" in the context of the present specification is understood to be a polymer obtainable by radical polymerization of two or more radically polymerizable monomers. It may be a statistical copolymer, i.e. the sequence of monomers is not subject to any particular order, or even an alternating or block copolymer.

According to the invention, a component A and a component B are copolymerized to produce the copolymers according to the invention. At least one ester of an at least dibasic carboxylic acid containing at least one olefinically unsaturated double bond with an alkylene oxide adduct is used as component A.

The at least dibasic carboxylic acid containing at least one olefinically unsaturated double bond may be selected, for example, from maleic acid, fumaric acid, itaconic acid, aconitic acid, 3,4,5,6-tetrahydrophthalic acid, crotonic acid or a mixture of two or more thereof.

Esters suitable for use as component A in accordance with the invention may be produced, for example, by only partly esterifying the olefinically unsaturated di- or polycarboxylic acids on which the esters are based, i.e. only some of the carboxylic acid groups available for esterification are esterified with a suitable alkylene oxide adduct. In addition, the carboxylic acid groups of the carboxylic acid may also be partly or completely reacted with an alkylene oxide so that the ester function is formed by alkoxylation.

Partial esters suitable for use as component A in one preferred embodiment of the present invention are, for example, partial esters of the above-mentioned carboxylic acids with alkylene oxide adducts of linear or branched saturated alcohols containing at least 8 carbon atoms. Suitable alcohols are, for example, the fatty alcohols containing at least 8 carbon atoms obtainable, for example, by reduction of natural fats or oils or by reduction of fatty acids or fatty acids cuts obtainable from natural fats or oils or derivatives thereof, for example esters with alcohols containing 1 to 4 carbon atoms.

Fatty alcohols particularly suitable for the production of the alkylene oxide adducts are, for example, octyl alcohol, nonyl alcohol, decyl alcohol, undecyl alcohol, dodecyl alcohol, tridecyl alcohol, tetradecyl alcohol, pentadecyl alcohol, hexadecyl alcohol, octadecyl alcohol, nonadecyl alcohol, Guerbet alcohols, unsaturated fatty alcohols, such as 12-hydroxystearyl alcohol, or higher homologs of such alcohols containing up to about 44 carbon atoms. The alkyl residue of the fatty alcohols may be linear or branched, saturated or unsaturated.

Other suitable alcohol components for the production of the partial esters are, for example, alkylene oxide adducts of correspondingly alkoxylatable compounds which have an OH group at the end of the alkoxy unit formed by the alkoxylation. Alkoxylatable compounds suitable for the production of the alkylene oxide adducts are, for example, dialkylamines with linear or branched, saturated or unsaturated alkyl chains containing a total of at least about 8 carbon atoms, linear or branched, saturated or unsaturated carboxylic acids, for example fatty acids, containing at least about 8 carbon atoms, linear or branched, saturated or unsaturated acid amides, for example fatty acid monoethanolamides, containing at least about 8 carbon atoms and linear or branched, saturated or unsaturated alkylamines; for example fatty amines, with at least 8 carbon atoms in the alkyl chain.

"Alkoxylates" or "alkylene oxide adducts" in the context of the present specification are understood to be the reaction products of suitable nucleophiles, for example correspondingly functionalized ethers, amines, carboxylic acids, carboxylic. acid amides or alcohols, with alkylene oxides, containing 2 to about 44 carbon atoms, more particularly about 8 to about 24 carbon atoms.

In one preferred embodiment of the invention, alkylene oxides containing 2 to 4 and more particularly 2 or 3 carbon atoms, for example ethylene oxide or propylene oxide, are used for the production of the alkylene oxide adducts. Only one alkylene oxide need be used for the production of the alkoxylation products, although two or more alkylene oxides may also be used. Where it is carried out with more than two alkylene oxides, the alkoxylation can lead either to a statistical or an alternating copolyalkylene oxide or to a block copolyalkylene oxide.

In one preferred embodiment of the invention, the alkoxylation by which the alkylene oxide adduct is formed is carried out with ethylene oxide.

The alkylene oxide adducts suitable for use as alcohol component in accordance with the present invention contain on average at least one alkylene oxide unit per molecule. In a preferred embodiment of the invention, the average number of alkylene oxide units per alcohol molecule should be at least about 1.5 and, more particularly, at least about 2.

In another preferred embodiment of the invention, the partial esters of olefinically unsaturated dicarboxylic acids which contain as their alcohol residue an alkoxylate of an alcohol, a carboxylic acid, a carboxylic acid amide, a dialkyl amine or a monoalkoxylate of an amine are used as component A. In another preferred embodiment of the invention, alkoxylates obtainable by alkoxylation of the compounds on which the alkoxylate is based with ethylene oxide or propylene oxide or both are used as the alcohol residue.

In a preferred embodiment of the invention, the alcohol residues on which the partial esters are based have amphiphilic properties. Amphiphilic properties can often be:characterized by the HLB value of the amphiphilic compound.

Alcohol components suitable for the production of the partial esters in accordance with the present invention have an HLB value of about 1.5 to about 18, for example about 2 to about 14 or about 3 to about 12.

In a preferred embodiment of the invention, the nucleophile on which the alkylene oxide adduct is based contains about 12 to about 24 carbon atoms, for example about 16 to about 20 carbon atoms.

The corresponding alkylene oxide adducts contain about 1 to about 40 alkylene oxide units, for example about 2 to about 12 ethylene oxide or propylene oxide units or both.

The partial esters may be used in the form of their free acids although they may also be used as salts, for example as alkali metal salts, or ammonium salts. A preferred embodiment of the invention is characterized by the use of partial ester salts with readily volatile amines, for example salts with butylamine or triethanolamine. Salt formation may be carried out before or after the polymerization.

Besides the partial esters already described, esters of unsaturated at least dibasic carboxylic acids with no carboxyl group (full esters), i.e. whose carboxyl groups are completely esterified, may be used as component A in another embodiment of the invention.

Such full esters contain as their alcohol residue at least one alkylene oxide adduct with a linear or branched, saturated or unsaturated alkyl group containing at least about 8 carbon atoms which has at least 1 to about 40 alkylene oxide units, for example about 2 to about 12 alkylene oxide units, between the alkyl group mentioned and the ester function emanating from the unsaturated carboxylic acid. Suitable alkylene oxide adducts were mentioned in the foregoing. In a preferred embodiment of the invention, the alkylene oxide units are ethylene oxide units or propylene oxide units or a mixture thereof, but especially ethylene oxide units.

An HLB value is a measure of the water or oil solubility of predominantly nonionic surfactants. For ethoxylates and their esters in particular, the HLB value=(E+P)/5 where E is the number of ethylene oxide units and P is the number of propylene oxide units (in % by weight) in the molecule. The HLB value of a surfactant or emulsifier mixture can be additively calculated from the values of its constituents. Detailed lists of HLB values of commercially available emulsifiers can be found, for example, in Fiedler, Lexikon der Hilfsstoffe für Pharmazie, Kosmetik oder angrenzende Gebiete or in Kirk-Othmer (3.) 8, 910–918.

The production of the semiesters or full esters suitable for use as component A is carried out under the standard rules of organic chemistry and is known to the expert. In a preferred embodiment of the invention, the semiester is formed from a carboxylic anhydride by addition of the corresponding alkylene oxide adduct. If a semiester is to be used as component A, the formation of the semiester may be carried out, for example, in situ before or even during the copolymerization of components A and B by dissolving a corresponding carboxylic anhydride and a corresponding alkylene oxide adduct or a mixture of two or more alkylene oxide adducts in component B introduced beforehand into the reactor.

According to the invention, at least one other radically polymerizable monomer is used as component B. Suitable monomers are, for example, the vinyl esters of carboxylic acids containing about 2 to about 44 carbon atoms. Suitable vinyl esters are, for example, vinyl acetate, vinyl propionate, vinyl butyrate, the vinyl esters of the isomeric pentanoic acids, hexanoic acids, heptanoic acids, octanoic acids, nonanoic acids, decanoic acids and higher homologs thereof. Also suitable for use as component B are, for example, acrylic acid, methacrylic acid, esters of acrylic acid or methacrylic acid with linear or branched alcohols containing 1 to about 44 carbon atoms, styrene, ethylene, propylene, butylene, pentylene, hexylene and the higher homologous a-olefins containing up to about 18 carbon atoms or butadiene.

Suitable esters of acrylic or methacrylic acid are, in particular, methyl acrylate, ethyl acrylate, propyl acrylate, butyl acrylate, tert.butyl acrylate, pentyl acrylate, hexyl acrylate, heptyl acrylate, octyl acrylate, nonyl acrylate and the acrylic acid esters with the higher homologs of the alcohols mentioned containing up to 44 carbon atoms, for example up to 18 carbon atoms. Suitable methacrylic acid esters are methyl methacrylate, ethyl methacrylate, propyl methacrylate, butyl methacrylate, pentyl methacrylate, hexyl methacrylate, heptyl methacrylate, octyl methacrylate, nonyl methacrylate or the methacrylic acid esters of the higher homologs of the above-mentioned alcohols containing up to about 44 carbon atoms, more particularly up to about 18 carbon atoms.

In the copolymerization of components A and B, component A is present in the polymerization mixture to be copolymerized in a quantity of about 0.01 to 70% by weight, for example in a quantity of 0.5 to about 50% by weight or about 1 to about 20% by weight, based on the mixture as a whole. In another preferred embodiment of the invention, vinyl acetate, vinyl propionate, vinyl laurate or vinyl versatate, more especially vinyl acetate, is used as component B.

In another preferred embodiment of the invention, a mixture of two or more copolymerizable monomers is used as component B. Suitable mixtures are, for example, mixtures of vinyl acetate, vinyl propionate, vinyl laurate or vinyl versatate with one or more of the other monomers mentioned above, more particularly with acrylic acid or methacrylic acid or the corresponding acrylic or methacrylic acid esters or a mixture of two or more of the compounds mentioned.

If mixtures of two or more monomers are used as component B, the mixture preferably contains at least one vinyl ester of a carboxylic acid, more particularly vinyl acetate. The percentage content of vinyl ester of a carboxylic acid in such a mixture should be at least about 30% by weight.

The copolymers according to the invention may be produced by the standard methods of radical polymerization. In a preferred embodiment of the invention, the polymerization is carried out as emulsion or suspension polymerization in water. The polymerization temperature is preferably about 50 to about 90° C. and more particularly about 75 to about 85° C.

The emulsifiers used for the emulsion polymerization may be any of those normally used. A protective colloid may optionally be added.

Typical water-soluble radical initiators may be used as starter molecules, i.e. to initiate the radical polymerization. Lipophilic radical initiators may be added in the suspension polymerization process.

Accordingly, the present invention also relates to a process for the production of a copolymer, characterized in that at least two components A and B are copolymerized, a) at least one ester of an at least dibasic carboxylic acid containing at least one olefinically unsaturated double bond with an alkylene oxide adduct being used as component A and b) at least one other radically polymerizable monomer being used as component B.

The copolymers according to the invention are used, for example, in adhesive preparations, such as dispersion adhesives, pressure-sensitive adhesives, in the production of adhesive films or for the production of redispersion powders.

Accordingly, the present invention also relates to a preparation at least containing 0.1% by weight of a copolymer according to the invention or a copolymer produced by the process according to the invention.

If alkylene oxide adducts containing olefinically unsaturated double bonds are used for the production of component A, the preparations according to the invention may additionally contain siccatives.

Besides the copolymers according to the invention, a preparation according to the invention may also contain up to about 50% by weight of typical additives. Such additives can influence, for example, the adhesive properties, the aging behavior, the setting process or adhesion. For example, the adhesive may. contain so-called tackifier resins which may generally be divided into natural and synthetic resins. These include, for example, alkyd resins, epoxy resins, melamine resins, phenolic resins, urethane resins, hydrocarbon resins and natural resins, such as rosin, wood turpentine oil and tall oil. The synthetic resins include hydrocarbon resins, ketone resins, coumarone-indene resins, isocyanate resins and terpene-phenol resins.

The adhesives according to the invention may also contain solvents. Suitable solvents are, for example, mono- or polyhydric alcohols containing about 2 to about 10 carbon atoms.

The adhesives according to the invention may also contain defoamers. Suitable defoamers are, for example, defoamers based on fatty alcohols or silicone.

The adhesives may also contain protective colloids, such as polyvinyl pyrrolidones, polyvinyl alcohols or cellulose or cellulose derivatives.

The adhesive according to the invention may also contain stabilizers or antioxidants as additives. Such additives generally include the phenols, for example sterically hindered high molecular weight phenols, polyhydric phenols, sulfur- and phosphorus-containing phenols or amines. Suitable stabilizers are, for example, hydroquinone, hydroquinone methyl ether, 2,3-(di-tert.butyl)-hydroquinone, 1,3,5-trimethyl-2,4,6-tris-(3,5-di-tert.butyl4-hydroxybenzyl)-benzene; pentaeryth ritol tetrakis-3-(3, 5-di-tert. butyl-4-hydroxyphenyl)-propionate; n-octadecyl-3,5-di-tert.butyl-4-hydroxyphenyl)-propionate; 4,4-methylene-bis-(2,6-di-tert.butyl phenol); 4,4-thiobis-(6-tert.butyl-o-cresol); 2,6-di-tert.butyl phenol; 6-(4-hydroxyphenyoxy)-2,4-bis-(n-octylthio)-1,3,5-triazine; di-n-octadecyl-3,5-di-tert.butyl-4-hydroxybenzyl phosphonates; 2-(n-octylthio)-ethyl-3,5-di-tert.butyl-4-hydroxybenzoate; sorbitol hexa-[3-(3,5-di-tert.butyl-4-hydroxyphenyl)-propionate and p-hydroxydiphenylamine or N,N'-diphenylene diamine or phenothiazine.

The adhesive according to the invention may also contain plasticizers, such as benzoate plasticizers, phosphate plasticizers, liquid resin derivatives or vegetable and animal oils. Suitable plasticizers are, for example, sucrose benzoate, diethylene glycol dibenzoate and/or diethylene glycol benzoate, in which about 50 to about 95% of all hydroxyl groups have been esterified, phosphate plasticizers, for example t-butyl phenyl diphenyl phosphate, polyethylene glycols and derivatives thereof, for example diphenyl ethers of poly(ethylene glycol), liquid resin derivatives, for example the methyl ester of hydrogenated resin, vegetable and animal oils, for example glycerol esters of fatty acids and polymerization products thereof.

Plasticizers based on phthalic acid, more particularly alkyl phthalates, are also suitable.

The adhesive according to the invention may also contain dyes, such as titanium dioxide, fillers, such as gypsum, talcum, clay and the like, and pigments.

The adhesives according to the invention may also contain emulsifiers and stabilizers or mixtures thereof. Suitable emulsifiers are, generally, surfactants containing a hydrophilic group and a hydrophobic group. These emulsifiers may be anionic emulsifiers, cationic emulsifiers or amphoteric emulsifiers. Other suitable emulsifiers are, for example, hydrocarbon emulsifiers containing about 6 to about 22 carbon atoms where the hydrocarbon chain may be branched, unbranched, saturated, unsaturated, substituted, aliphatic or aromatic.

The present invention also relates to the use of a copolymer according to the invention or a copolymer produced by a process according to the invention as binder in adhesive preparations, sealants, films or surface coating compositions.

The invention is illustrated by the following Examples.

EXPERIMENTAL PART

Preparation of Maleic Acid/$C_{12/14}$ Fatty Alcohol×4 EO Semiester 367 g maleic anhydride (3.74 mol) and 800 g Dehydol LS 4 ($C_{12/14}$ fatty alcohol×4 EO, 3.74 mol) are stirred under nitrogen for 3 hours at 120° C. After cooling, 1 150 g of the semiester are obtained in the form of a paste. Acid value= 139 mg KOH/g

EXAMPLE 1

Preparation of a Copolymer Dispersion of Vinyl Acetate and Maleic Acid $C_{12/14}$ Fatty Alcohol×4 EO Semiester 16 g of an initiator solution of 6 g potassium peroxodisulfate and 110 g water are added with stirring to 862 g of a "preliminary" solution—heated to 75–80° C.—of 809 g deionized water, 1.8 g nonylphenol containing 9.5 mol EO, 20 g sulfosuccinic acid bis-2-ethyl hexyl ester sodium salt, 1.4 g sodium hydrogen carbonate and 30 g partly saponified polyvinyl alcohol. The remaining initiator solution (100 g) and the monomer solution consisting of 914 g vinyl acetate and 102 g of the maleic acid semiester are then added dropwise under reflux over a period of 5 hours at that temperature (75–80° C.). It is important to ensure that the temperature does not exceed 85° C. during the addition. After removal of the coarse-particle constituents by filtration, ca. 1950 g of a polymer dispersion with the following properties are obtained:

| pH value: | 2.5 to 3.5 |
|---|---|
| solids: | ca. 55% |
| viscosity: | 11,000 mPas. |

EXAMPLE 2

Preparation of a Homopolymer Dispersion Containing Vinyl Acetate 10 g of an initiator solution of 4 g potassium peroxodisulfate and 76 g water are added with stirring to 893.2 g of a "preliminary" solution—heated to 75–80° C.—of 799 g deionized water, 1.8 g nonylphenol containing 9.5 mol EO, 20 g sulfosuccinic acid bis-2-ethyl hexyl ester sodium salt, 1.4 g sodium hydrogen carbonate and 71 g partly saponified polyvinyl alcohol. The remaining initiator solution (70 g) and 816 g vinyl acetate are then added dropwise under reflux over a period of 5 hours at that temperature (75–80° C.). It is important to ensure that the temperature does not exceed 85° C. during the addition. After removal of the coarse-particle constituents by filtration, ca. 1760 g of a polymer dispersion with the following properties are obtained:

| pH value: | 5.5 |
|---|---|
| solids: | ca. 51% |
| viscosity: | 9,000 mPas. |

Comparison of the properties:

| | Copolymer dispersion (Example 1) | Homopolymer dispersion (Example 2) |
|---|---|---|
| D1* | 12 N/mm$^2$ | 11.2 N/mm$^2$ |
| Ultimate tensile stress | 4.5 N/mm$^2$ | 15 N/mm$^2$ |
| Elongation at break | 2200% | 20 to 30% |

*= adhesive strength to European Standard 204, May 1991

What is claimed is:

1. A copolymer consisting of the monomers:
   a) one or more esters of one or more at least dibasic carboxylic acids having one olefinically unsaturated double bond with one or more adducts of $C_{2-44}$ alkylene oxides and one or more linear or branched, saturated fatty alcohols, dialkylamines, carboxylic acids, amides, or alkylamines containing 8 or more carbon atoms, said adducts containing 1 to 12 alkylene oxide units; and
   b) one or more other radically polymerizable monomers selected from the group consisting of vinyl esters of $C_{2-44}$ carboxylic acids, acrylic acid, esters of acrylic acid or methacrylic acid with $C_{1-44}$ alcohols, and α-olefins containing up to 18 carbon atoms.

2. The copolymer of claim 1, wherein a) comprises a partial ester comprising at least one carboxyl group.

3. The copolymer of claim 1, wherein a) comprises an ester of one or more of maleic acid, fumaric acid, citraconic acid, itaconic acid, aconitic acid, and 3,4,5,6-tetrahydrophthalic acid.

4. The copolymer of claim 2, wherein a) comprises an ester of one or more of maleic acid, fumaric acid, citraconic acid, itaconic acid, aconitic acid, and 3,4,5,6-tetrahydrophthalic acid.

5. The copolymer of claim 1, wherein a) comprises at least one alkylene oxide adduct having an HLB value of about 2 to about 20.

6. A process of making a copolymer comprising the steps of:
   a) forming a reaction mixture of monomers consisting of one or more esters of one or more at least dibasic carboxylic acids having one olefinically unsaturated double bond with one or more adducts of $C_{2-44}$ alkylene oxides and one or more linear or branched, saturated fatty alcohols, dialkylamines, carboxylic acids, amides, of alkylamines containing 8 or more carbon atoms, said adducts containing 1 to 12 alkylene oxide units and one or more other radically polymerizable monomers selected from the group consisting of vinyl esters of $C_{2-44}$ carboxylic acids, acrylic acid, esters of acrylic acid or methacrylic acid with $C_{1-44}$ alcohols, and α-olefins containing up to 18 carbon atoms; and
   b) copolymerizing the monomers by radical polymerization.

7. The process of claim 6, wherein the reaction mixture comprises 0.1% to 70% by weight of the one or more esters of the one or more at least dibasic carboxylic acids having are olefinically unsaturated double bond with the one or more alkylene oxide adducts.

8. An adhesive, sealant, film, surface coating, or powder composition comprising as a binder at least 0.1% by weight of the copolymer of claim 1.

9. The copolymer of claim 1, wherein the one or more alkylene oxide adducts comprise reaction products of one or more fatty alcohols selected from the group consisting of octyl alcohol, nonyl alcohol, decyl alcohol, undecyl alcohol, dodecyl alcohol, tridecyl alcohol, tetradecyl alcohol, pentadecyl alcohol, hexadecyl alcohol, octadecyl alcohol, and nonadecyl alcohol.

10. The copolymer of claim 9, wherein the alkylene oxides have 2 to 4 carbon atoms.

11. The copolymer of claim 1, wherein a) comprises at least one alkylene oxide adduct having an HLB value of about 1.5 to about 18.

12. The copolymer of claim 11, wherein a) comprises at least one alkylene oxide adduct having an HLB value of about 2 to about 14.

13. The copolymer of claim 12, wherein a) comprises at least one alkylene oxide adduct having an HLB value of about 3 to about 12.

14. The copolymer of claim 1, wherein the alkylene oxide adducts have about 1 to about 40 alkylene oxide units.

15. The copolymer of claim 1, wherein the alkylene oxide adducts have about 2 to about 12 of one or both of ethylene oxide or propylene oxide units.

* * * * *

UNITED STATES PATENT AND TRADEMARK OFFICE
CERTIFICATE OF CORRECTION

PATENT NO. : 6,653,428 B1
DATED : November 25, 2003
INVENTOR(S) : Klein et al.

It is certified that error appears in the above-identified patent and that said Letters Patent is hereby corrected as shown below:

Column 8,
Line 25, delete "of" and insert therefore -- or --.
Line 38, delete "are" and insert therefore -- one --.

Signed and Sealed this

Second Day of November, 2004

JON W. DUDAS
*Director of the United States Patent and Trademark Office*